United States Patent
Avril

[15] 3,675,790
[45] July 11, 1972

[54] BAG STACKING MACHINE

[72] Inventor: Arthur C. Avril, Cincinnati, Ohio

[73] Assignee: A & T Development Corporation, Cincinnati, Ohio

[22] Filed: Nov. 25, 1970

[21] Appl. No.: 92,616

[52] U.S. Cl. .............................. 214/6 P, 214/6 G, 214/6 DK
[51] Int. Cl. ........................................................ B65g 57/28
[58] Field of Search ....................... 214/6, 6 A, 6 B, 6 C, 6 D, 214/6 DK, 6 F, 6 FS, 6 G, 6 N, 6 M, 6 P, 6.5; 271/65, 66, 70, 83

[56] References Cited

UNITED STATES PATENTS

| 3,306,471 | 2/1967 | Devol | 214/6 P X |
| 3,262,594 | 7/1966 | Teago | 214/6 A |
| 3,381,828 | 5/1968 | Sheehan | 214/6 P |
| 3,014,600 | 12/1961 | Tray | 214/6 D |
| 2,977,002 | 3/1961 | Asp | 214/6 DK |

FOREIGN PATENTS OR APPLICATIONS

| 1,323,324 | 2/1963 | France | 214/6 DK |

*Primary Examiner*—Robert J. Spar
*Attorney*—Wood, Herron & Evans

[57] ABSTRACT

A stacking machine which deposits upon a pallet individual bags of premixed dry concrete, cement, mortar mixtures and other products as the filled bags issue from a processing machine. The stacking machine, in general, comprises a stationary base, a lift and carriage assembly shiftable vertically and also laterally along the base, with a flipper arm including gripping jaws swinging relative to the carriage. The bags are fed at random to a bag conveyor having a lower receiving end tracked upon the floor and an upper discharge end swiveled to the carriage and disposed above the flipper arm so that the bags may issue from the conveyor to be discharged by the flipper arm.

A turntable, carrying a suitable pallet, receives the filled bags from the flipper arm so that a layer of bags having a predetermined pattern may be deposited upon the pallet by the coordinated lateral motions of the carriage, swinging movements of the flipper arm, and rotary indexing movements of the turntable. As each layer of the stack is deposited, the carriage and its arm is shifted upwardly approximately the thickness of one layer of bags, such that successive layers are placed upon one another in order to build up a stack of bags in interlocked relationship. Suitable control apparatus including limit switches program the coordinated movements of the several components until a stack is built up after which the interlocked stack is removed for transport or storage.

18 Claims, 17 Drawing Figures

INVENTOR.
Arthur C. Avril
BY
Wood, Herron & Evans
ATTORNEYS

BAG STACKING MACHINE

BACKGROUND OF THE INVENTION

The invention involves the mechanical handling and stacking of bags, which operation ordinarily is performed by hand. The stacking machine has been developed particularly in the handling and transport of relatively heavy bags of dry granulated materials and is disclosed, by way of example, in the handling of dry premixed concrete. In a general way, the raw material may be prepared in a dryer (Avril U.S. Pat. No. 3,514,870) which, in the case of premixed concrete, dehydrates the materials (sand and aggregates) in predetermined proportions. The dehydrated mixture then discharges into a blender with dry portland cement (Avril U.S. Pat. No. 3,369,798) which delivers the mixture to a moisture repellant paper bag. After being filled, by operation of the blender, the bag is sealed by a bag stitching machine mounted adjacent the discharge spout of the blender and is ready for storage or sale.

A bag closing and stitching machine of the type with which the present stacking apparatus may coact, is disclosed in U.S. Pat. No. 3,097,461 to Arthur C. Avril. The bag stitching and closing machine essentially comprises a horizontal stitching conveyor extending from the discharge spout of the blender to a stitching machine or head. In operation, the empty bags are placed by an operator upon the conveyor beneath the discharge spout of the blender to be filled. The filling operation is carried out by the operator who depresses a switch in response to a visual signal.

After the dehydrated, warm, blended materials are discharged into the bag, the conveyor is operated to advance the filled bags towards and through the stitching machine at which point, the open end of the bag is closed, a tape is placed upon the marginal edges across the open top, then the stitching machine applies a line of stitching through the tape and through the marginal edges of the closed bag to provide the seal. After the upper portion of the bag has been taped and stitched, the stitching machine is de-energized, the ends of the tape are trimmed off and the filled bag is conveyed toward the end of the stitcher conveyor.

As each bag advances toward the discharge end of the horizontal stitcher conveyor, it normally is lifted manually from the conveyor and stacked upon a pallet. Since the bags are heavy, hand stitching is laborious and expensive. According to the present stacking machine, the bag, after reaching the end of the horizontal stitcher conveyor, drops to the receiving end of a bag conveyor. The bag conveyor forms a part of the stacking machine and comprises an upwardly inclined transport belt and frame having a lower end tracked upon the floor below the stitching machine conveyor and an upper end joined by a universal swivel to a vertically movable carriage. The upper or discharge end of the bag conveyor deposits the bag upon a flipper arm, as part of the vertically movable carriage, the arm having a pair of bag gripping jaws.

The stacking machine is arranged to operate through its individual cycles in response to the discharge of each individual bag at random fashion from the upper discharge end of the inclined bag conveyor and transfer into the machine. The bag conveyor operates continuously so as to carry away each bag as it is discharged at random from the stitcher conveyor in filled, dehydrated and sealed condition.

It has been one of the primary objectives of the invention to provide a simple stacking machine which responds, in random fashion to the delivery of each filled bag from the upper or discharge end of the bag conveyor to the downwardly inclined flipper arm (including the jaws which grasp the bag) the flipper arm thereafter swinging through an arc and depositing the bag upon a pallet carried by an indexing turntable, whereby a stack may be built up in a predetermined regular pattern upon the pallet.

Described generally, the stacking machine comprises a base structure including tracks supporting the lift assembly for lateral motion relative to the base. The lift assembly further includes the vertically movable carriage including a rock shaft supporting the flipper arm for transfer movement in an arc between the discharge end of the bag conveyor to the pallet for deposit of the bag. The machine includes a control circuit and limit switches by means of which the several components may be programmed to carry out each sequence in a predetermined order.

During an operating cycle, in response to deposit of a bag from the bag conveyor to the flipper arm, the bag slides downwardly between the pair of gripping jaws and engages a stop which includes a switch interconnected with the circuit. The circuit then is activated to cause the arm to swing through its arc and thereby deliver the bag to the pallet resting upon the turntable.

After deposit of the bag, the arm swings back toward the loading position and the programming system may cause rotary indexing movement, for example through an angle of 90°, of the turntable so as to place the pallet in a position to receive a successive bag. The flipper arm remains at rest in its receiving position adjacent the discharge end of the upwardly inclined bag conveyor until the next bag is delivered to it.

After a given layer of bags has been deposited upon the pallet in a predetermined pattern, the lift assembly, carriage and arm may be shifted laterally, as determined by the programming of the machine, so as to deposit the next layer preferably in interlocked relationship with the layer below. Each layer is thus deposited by the coordinated swinging movements of the arm, indexing movements of the turntable and lateral movements of the lift assembly and carriage so as to build up an interlocked stack. After one layer is deposited, the carriage assembly and flipper arm are raised as a unit in an upward direction, the distance being equal to the thickness of a single layer of bags. In this way a second and successive layer of bags are deposited in stack formation upon the pallet until the carriage and arm reaches the upper limit of vertical movement, with the stack completed and with the bags laid in interlocking relationship.

A further objective of the invention has been to provide a machine in which the bags are stacked upon one another in a manner generally similar to that employed in hand stacking, that is, each bag is brought into a position spaced slightly above the top of the supporting surface such as platen or a previously deposited layer then dropped so as to distribute and flatten the contents of the bag in a natural manner.

In order to carry out this concept, the normally open bag gripping mechanism or spaced jaws when closed, establish a gripping engagement with the upper or trailing end portion of the bag as it is discharged by the bag conveyor to the arm. The bag is thus grasped between the closed jaws, with its lower end portion resting upon the arm and engaging a stop element which includes a switch. As the flipper arm swings through its arc toward the pallet and approaches the supporting surface (either pallet surface or a previously deposited layer of bags), the lower or free end portion of the bag drops downwardly by gravity from its stop element and switch and rests upon the stack. The gripping jaws are caused to open at this point, allowing the upper portion of the bag, previously gripped between the jaws, to drop by gravity upon the surface and thereby tending to distribute the contents of the bag evenly. This action is somewhat similar to that employed in manual operations in which the bag is grasped along opposite sides and lifted from the stitcher conveyor to a pallet then dropped to spread out the contents.

A further objective has been to provide a stacking machine in which the control circuit may be programmed to provide any desired stack pattern (within limits), in each case, the end portion of the bags of each layer being interlocked with one another to stabilize the stack for transport by the fork lift truck or other device which engages the pallet.

In carrying out this concept, the coordinated rotary indexing movements of the turntable, the transverse or shifting movements of the lift assembly (including the carriage), and the swinging movements of the flipper arm are all coordinated with one another to produce each layer of the stack to a predetermined pattern. The programming is regulated by switch abutments or cams arranged to trip the switches, which in turn are inter-connected with an electrical control system to provide the desired coacting movements in response to the proper location of the switch buttons and appropriate changes in the control system.

Each component of the machine, consisting of the lift assembly (lateral movement) carriage (vertical movement) and flipper arm (swinging movement) are carried out preferably by power cylinders which are actuated by suitable valves controlled by the electrical circuit. The rotary indexing movements are imparted to the turntable, preferably in steps of 90° each, by a hydraulic motor and suitable indexing and locking devices. These components are also interconnected with the electrical system which regulates the operation of the turntable power motor.

The various features of the invention will be more clearly understood by those skilled in the art from the following detailed description made in connection with the accompanying drawings.

GENERAL ORGANIZATION

Figure 1:
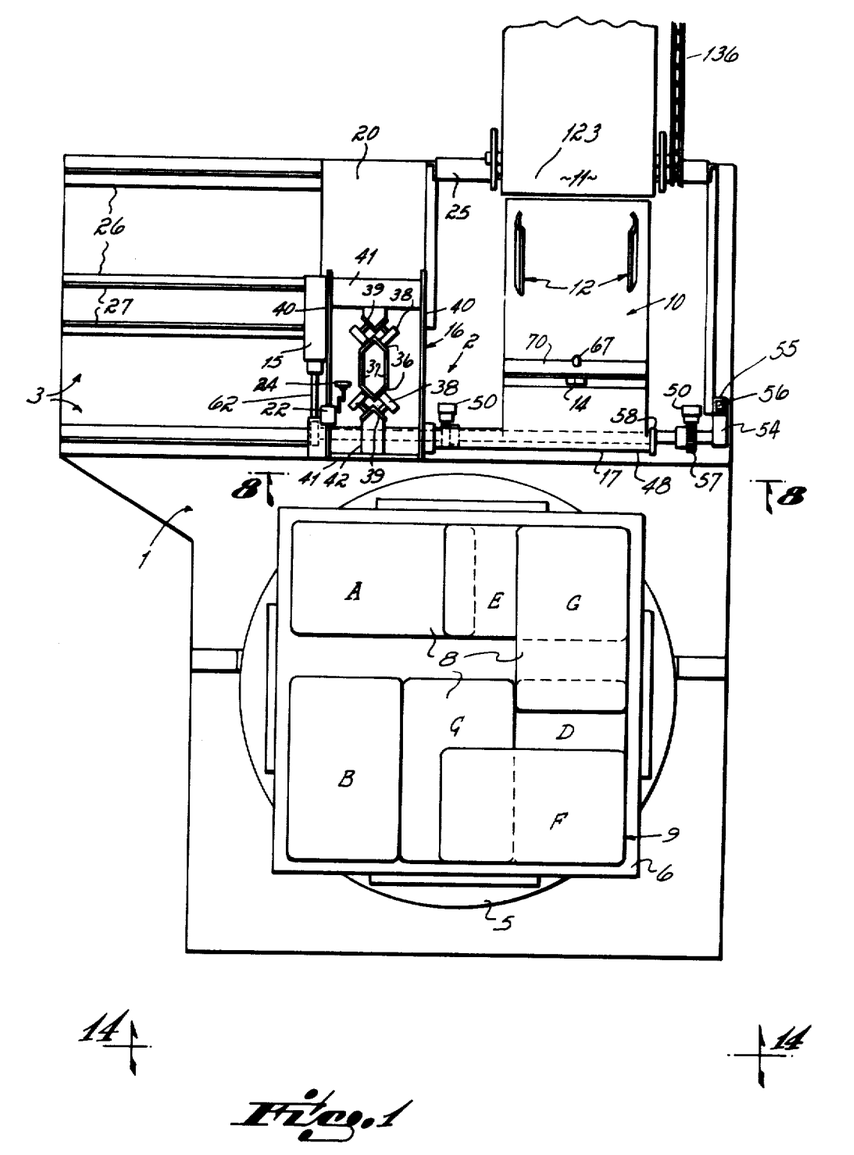
FIG. 1 is a general top plan view of the bag stacking machine, showing in a general way, several coacting components.
Figure 8:
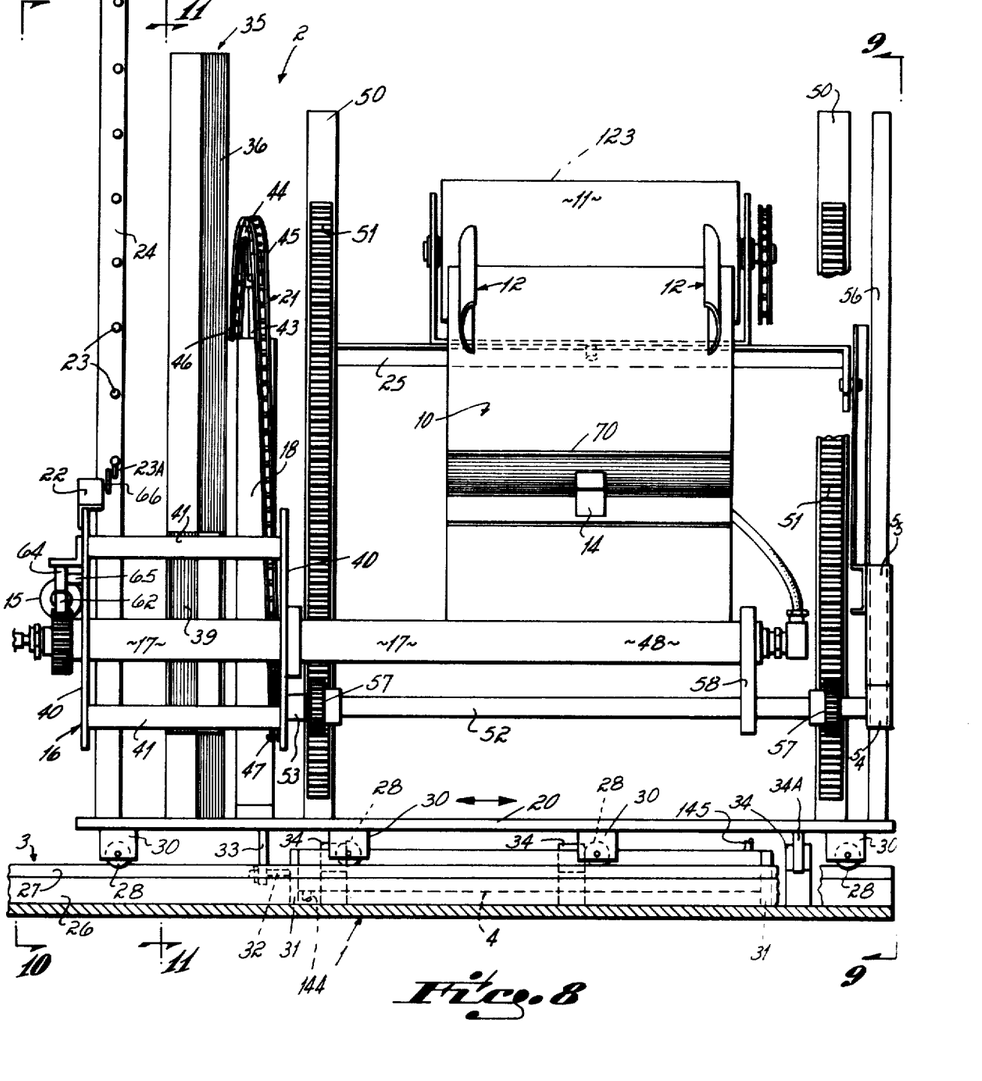
FIG. 8 is a front elevation of the stacking machine, taken along line 8—8 of FIG. 1, with the carriage and its flipper arm lowered at the start of the stacking operation, corresponding to that shown in FIGS. 2 - 7, for depositing a first layer of bags in building up the stack.
Figure 10:
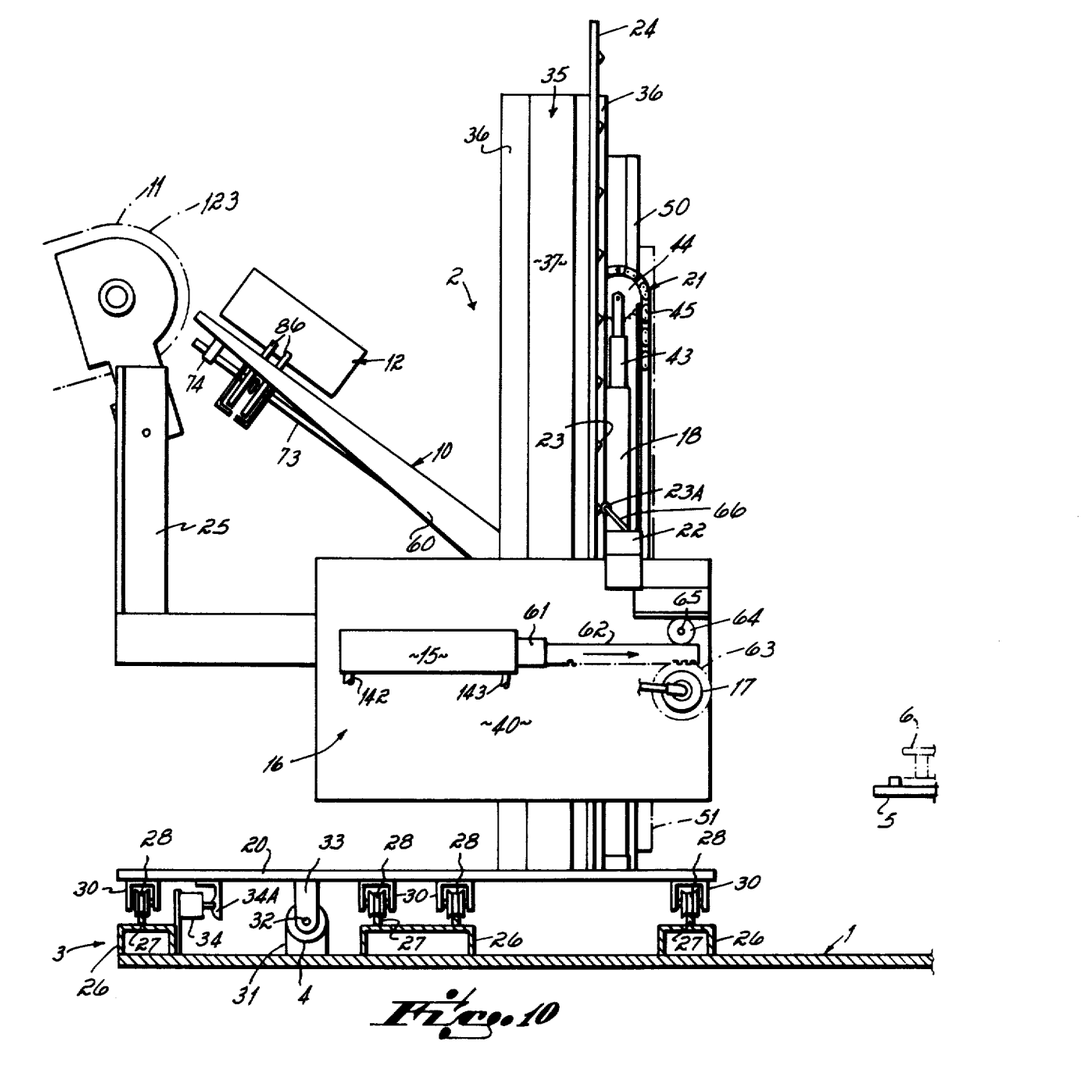
FIG. 10 is a side veiw as viewed along the line 10—10 of FIG. 8, illustrating the stacking machine from the opposite side to that shown in FIG. 9, further illustrating the machine.

Described generally, the bag stacking machine is assembled as a unit with the several components mounted for coaction upon a base plate, indicated generally at 1 (FIGS. 1, 8 and 10). The base 1 supports a bag lift assembly 2 which reciprocates relative to the base 1 upon tracks 3, as described later. Reciprocation is imparted to lift assembly 2 by a power cylinder 4 mounted upon the base and connected to the lift assembly.

Figure 11:
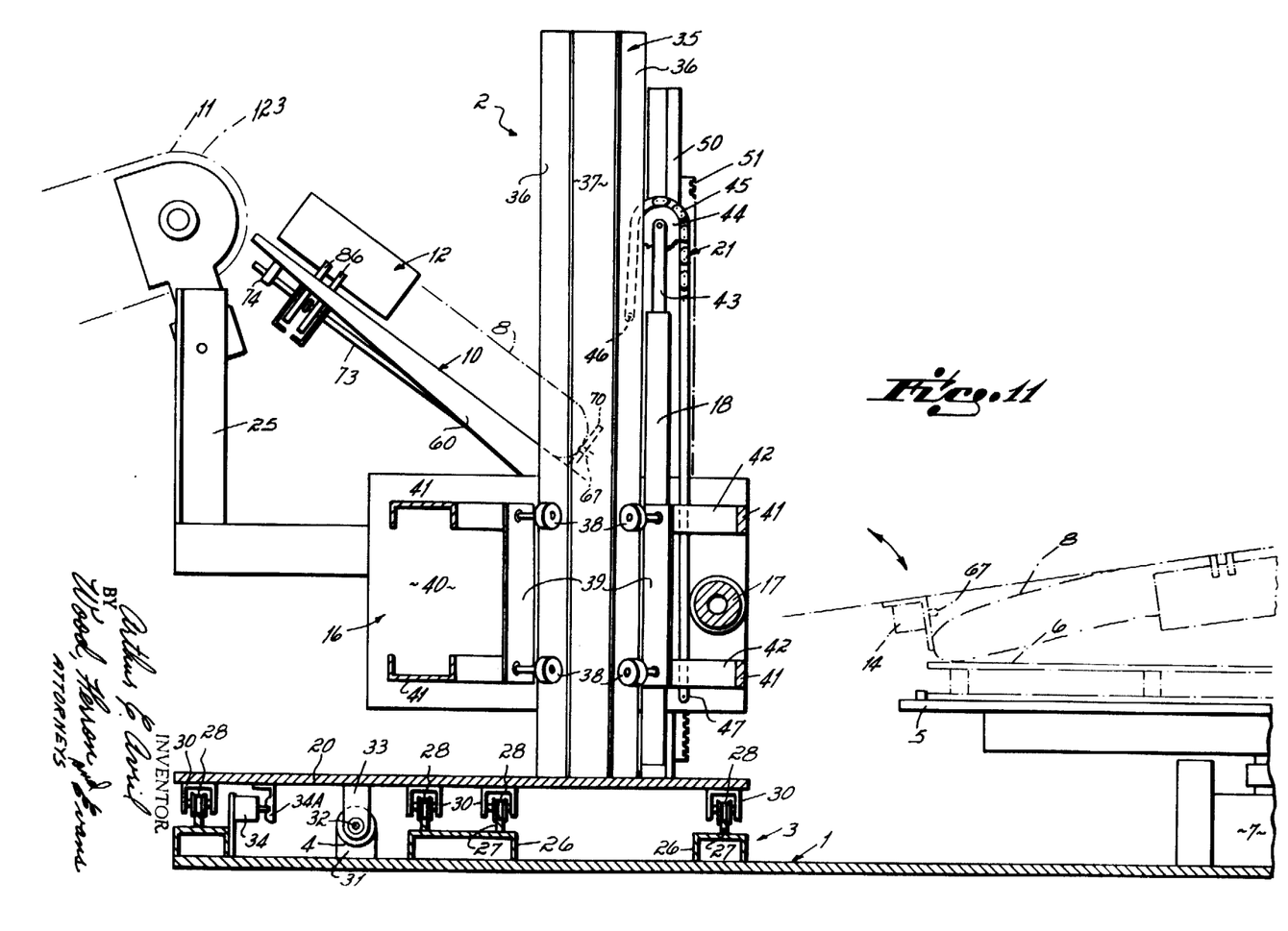
FIG. 11 is a sectional view taken along the line 11—11 of FIG. 8, with portions of the machine in cross-section to further illustrate the construction.

Generally speaking, the lift is arranged for reciprocation relative to a rotary turntable, indicated at 5 (FIG. 11). The turntable is indexed through 90° angles in time with the other components of the machine in order to stack the bags 8 (FIGS. 2 – 7) in a prearranged pattern, as explained later, upon a pallet 6 which rests upon the turntable to receive the stack of bags 8, the stack being indicated at 9. By this arrangement, each pallet 6, with the bags stacked upon it, may be removed from the turntable by a fork lift truck or similar device and transported to a storage area in the warehouse or, in some cases, directly into a truck for highway transport to the construction site. The several power units which operate the components of the machine preferably are hydraulically operated and are regulated by an electrical control system.

Figure 14:
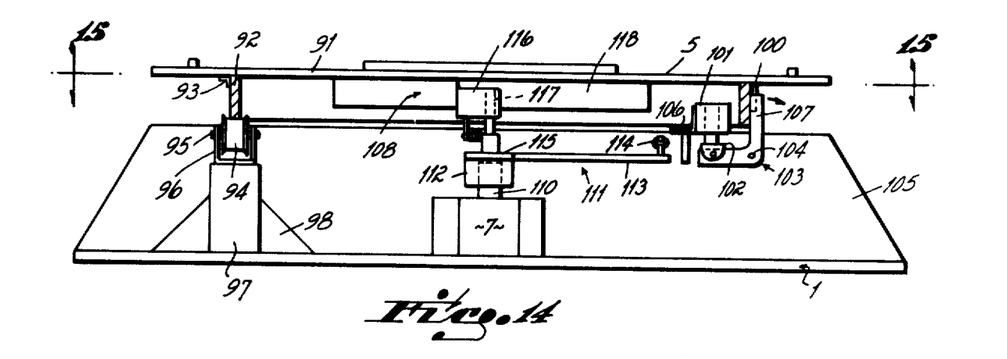
FIG. 14 is a front elevation, as viewed along line 14—14 of FIG. 1 partially in section, and illustrating the turntable and its actuating mechanism.

Thus, rotary indexing movements are imparted to the turntable 5 and pallet 6 by a power unit consisting of a rotary hydraulic motor 7 (FIGS. 14 and 15) having a pawl and ratchet mechanism 108 in driving connection with the turntable 5 and operated by the electrical control system which coordinates the operation of the several components.

In order to place the loaded bags in the desired stack formation as indicated at 9 (FIGS. 2 and 7), the lift assembly 2 includes a swinging bag transfer arm or flipper 10 projecting outwardly from the lift assembly 2 and swinging through an arc from a bag stacker conveyor 11 to a position for depositing the bag upon the pallet 6. The swinging arm 10 includes a pair of bag gripping jaws 12 which close upon the bag 8 as the bag is deposited between the jaws 12 at the delivery end of a stacker conveyor 11.

Figures 12, 13:
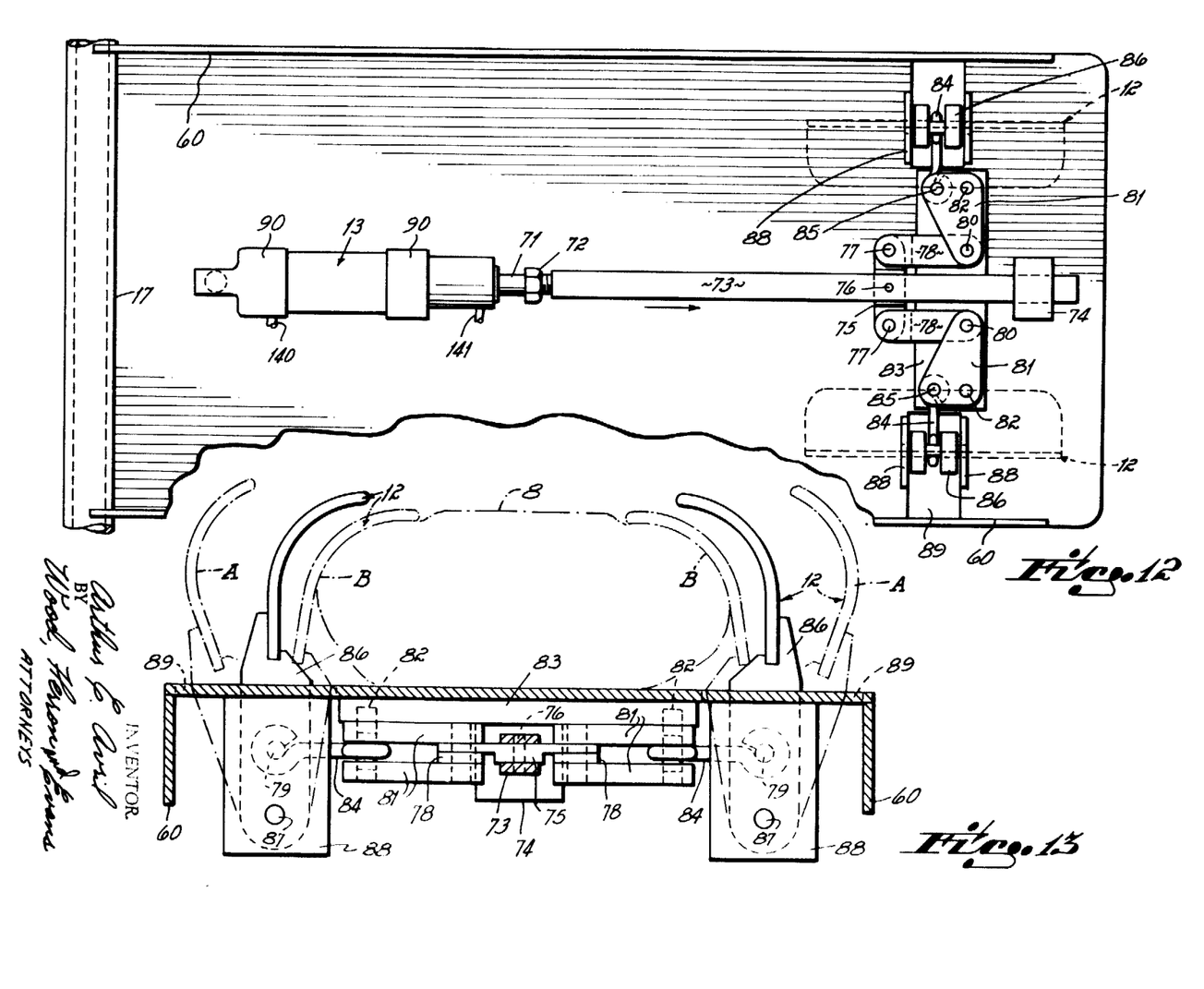
FIG. 12 is a bottom view, taken along line 12—12 of FIG. 9 showing the bag transfer arm or flipper which transfers the bag from the bag conveyor to the pallet, and particularly illustrating the mechanism for actuating the bag gripper jaws.
FIG. 13 is a sectional view taken along the line 13—13 of FIG. 9, further detailing the construction of the arm operating mechanism and bag gripping jaws.

The closing action of the jaws is initiated by a bag-actuated switch 14 in response to the delivery of each bag, the switch forming a part of the electric control circuit. Clamping pressure is applied to the jaws 12—12 by a hydraulic power cylinder, indicated generally at 13 (FIG. 12), which is energized by the tripping of a bag-actuated switch 14. The jaws 12 close upon bag 8, as indicated in FIG. 13 (upon tripping of switch 14 by the bag) under sufficient pressure to hold the bag firmly in place during the swinging motion of transfer arm 10 to deposit the bag upon the stack 9 in its proper position within the stack pattern. After the bag is placed upon the stack, the jaws 12 are opened to release the bag, then the arm 10 swings back to the receiving position relative to stacker conveyor 11 and remains there until the next bag is deposited by the conveyor or into the jaws for transfer to the stack.

The swinging movements are imparted to arm 10 by operation of a power cylinder 15 (FIG. 10) which is energized to swing the arm 10 from its receiving position (FIG. 10) to the discharge position (FIG. 11) in response to operation of the bag-actuated switch 14. Thus after the bag is deposited and the jaws 12 are closed (cylinder 13) to grasp the bag, then the power cylinder 15 (arm actuating cylinder) is energized in a direction to swing the arm 10 from the receiving to the delivery position. After the bag is delivered to the pallet and released by the jaws, then the arm cylinder 15 is energized in the opposite direction to swing arm 10 back to the receiving position, thus ending the cycle until the next bag arrives.

After one layer of bags has been deposited upon the pallet 6 in the required pattern, it is necessary to raise the swinging arm or flipper 10 (including jaws 12) a distance corresponding generally to the thickness of the bags so that successive layers of bag may be deposited in a predetermined interlocking pattern. For this purpose, there is provided a lift carriage, indicated generally at 16, the swinging arm 10 having its lower portion joined to a rock shaft 17 (FIGS. 8 and 9) journalled relative to carriage 16. The carriage 16, which forms a part of lift assembly 2, is guided for vertical motion upon a vertical column 35 rising from the reciprocating platform 20 of the lift mechanism, as described later. The lift carriage 16 includes pinions meshing with racks to provide the lifting action by operation of the lift cylinder 18, as explained in detail later. Cylinder 18 is connected to the carriage through a chain and sprocket drive, indicated generally at 21, which in the present example, doubles the effective stroke of the power cylinder 18 and vertical carriage and arm motion.

The several levels of the carriage 16 and arm 10 are regulated by a levelling switch 22 (FIG. 10) which is actuated by the trip abutments 23 mounted upon a standard 24 rising from reciprocating platform 20. The spacing of the trip abutments or buttons 23 corresponds to the thickness of the bags, the arrangement being such that the carriage 16 and its arm 10 progresses upwardly as the layers of bags 8 successively are deposited in stack formation 9 upon the pallet 6.

The discharge end of the bag stacker conveyor 11 is hinged to the lift carriage 16 by the structural steel frame 25, the lower or receiving end of the conveyor being movably supported by rollers tracking on the floor, as described later. The frame 25 also permits swivelling motion of the upper or discharge end of conveyor 11 in the horizontal plane relative to carriage 16 to compensate for lateral carriage movements. In this manner, the upper or discharge end of conveyor 11 remains at a constant elevation with respect to the jaws 12 of arm 10 vertically and horizontally as the carriage 16 shifts.

It will be understood at this point, that the cycles of operation are regulated by the bag-actuated switch 14 of arm 10 in response to the random arrival of a bag 8 at the discharge end of conveyor 11. As described later, the bag stacking cycles are initiated as the individual bags are filled by the blending apparatus after which the open end of the bag is closed by stitching. The cycles of operation of the stacking machine are dependent upon the manual operation of the blending apparatus and stitching machine, as explained later.

LIFT ASSEMBLY

The lift assembly 2, which as noted, is supported upon the common base plate 1 which also supports the turntable 5 (FIG. 11). The tracks 3 which support the lift assembly 2 for reciprocation comprise three parallel channel irons 26 having their lower edges secured by welding to base 1. Each channel iron includes a rail 27 welded to the cross web of the channel iron and tracking a flanged roller 28 carried for rotation in U-shaped brackets 30. The brackets are secured by welding to the platform 20 of the lift assembly 2.

As shown in FIG. 8, platform 20 is provided with three sets of flanged rollers 28 and mounting brackets 30 spaced longitudinally and the channel irons 26 and rails 27 are of sufficient length to allow the lift assembly to reciprocate relative to the base 1, as indicated by the arrow. The degree or amplitude of reciprocation is equal to the distance required to stack the bags 8 in staggered relationship upon the pallet 6 which is carried by the rotating turntable 5. The process of placing the bags in overlapping formation to stabilize the stack 9 is carried out by the combined rotary indexing movements of the turntable 5, the reciprocation of the lift mechanism 2 and the movements of the swinging bag transfer arm or flipper arm 10, as explained later in detail.

As noted earlier, reciprocating motion is imparted to the platform 20 and lift assembly 2 by the power cylinder 4, secured by mounting blocks 31 to the base 1 (FIG. 8) and having a piston (not shown) including a piston rod 32 connected to the lift platform 20 by a bracket 33. The piston is energized by suitable conduits communicating with a control valve (not shown). The control valve is operated by the electrical control circuit which includes, in the present instance, four limit switches 34 tripped by a switch actuating trip cam 34A to control lateral movements and positions of the lift assembly 2, as explained later. The piston of cylinder 4 reciprocates the lift assembly 2 horizontally in forward and reverse directions by the supplying and exhausting of hydraulic pressure relative to the opposite ends of cylinder 4 in response to operation of switches 34.

As noted earlier, the carriage 16 of the lift mechanism 2 is shifted vertically relative to platform 20 and supports the flipper or arm 10 for swinging motion in forward and reverse directions through an arc between the delivery end of the bag stacker conveyor 11 and the pallet 6 resting upon the turntable 5. The lift carriage 16, which raises and lowers the swinging arm 10, is guided upon the vertical column 35, previously noted, which rises from the lift platform 20. Column 35 is diamond-shaped in cross section, having V-shaped ways 36 facing outwardly in opposite directions and joined by plates 37. The carriage 16 is provided with opposed pairs of rollers 38 disposed angularly to conform with the slope of the V-shaped ways 36 mounted in sets, one above another (FIG. 11) and journalled in opposed angle irons 39—39.

The carriage 16 is of composite construction (FIGS. 1, 8 and 9), consisting in part, of spaced side plates 40—40, the opposite edges of which are joined together by cross pieces 41—41. The rearward set of guide rollers 38 is journalled upon the angle iron 39 which is secured to the rearward cross piece 41 and the forward guide rollers are journalled upon the forward angle iron 39 secured to a mounting block 42.

The carriage 16 and its swinging arm 10, as a unit, is shifted vertically by the lift cylinder 18 (FIGS. 10 and 11). Lift cylinder 18 has its lower end secured to the lift platform 20 and includes a piston (not shown) having a piston rod 43 projecting from its upper end. A sprocket 44 is journalled upon the upper end portion of piston rod 43 and meshes with a sprocket chain 45. The sprocket chain 45 has one end anchored as at 46 (FIG. 11) to the vertical guide column 35, passes about sprocket 44, with its lower end anchored as at 47 to carriage 16. This provides a motion-increasing drive, whereby the carriage is shifted upwardly and downwardly a distance equal to twice the stroke of piston rod 43.

Figure 9:
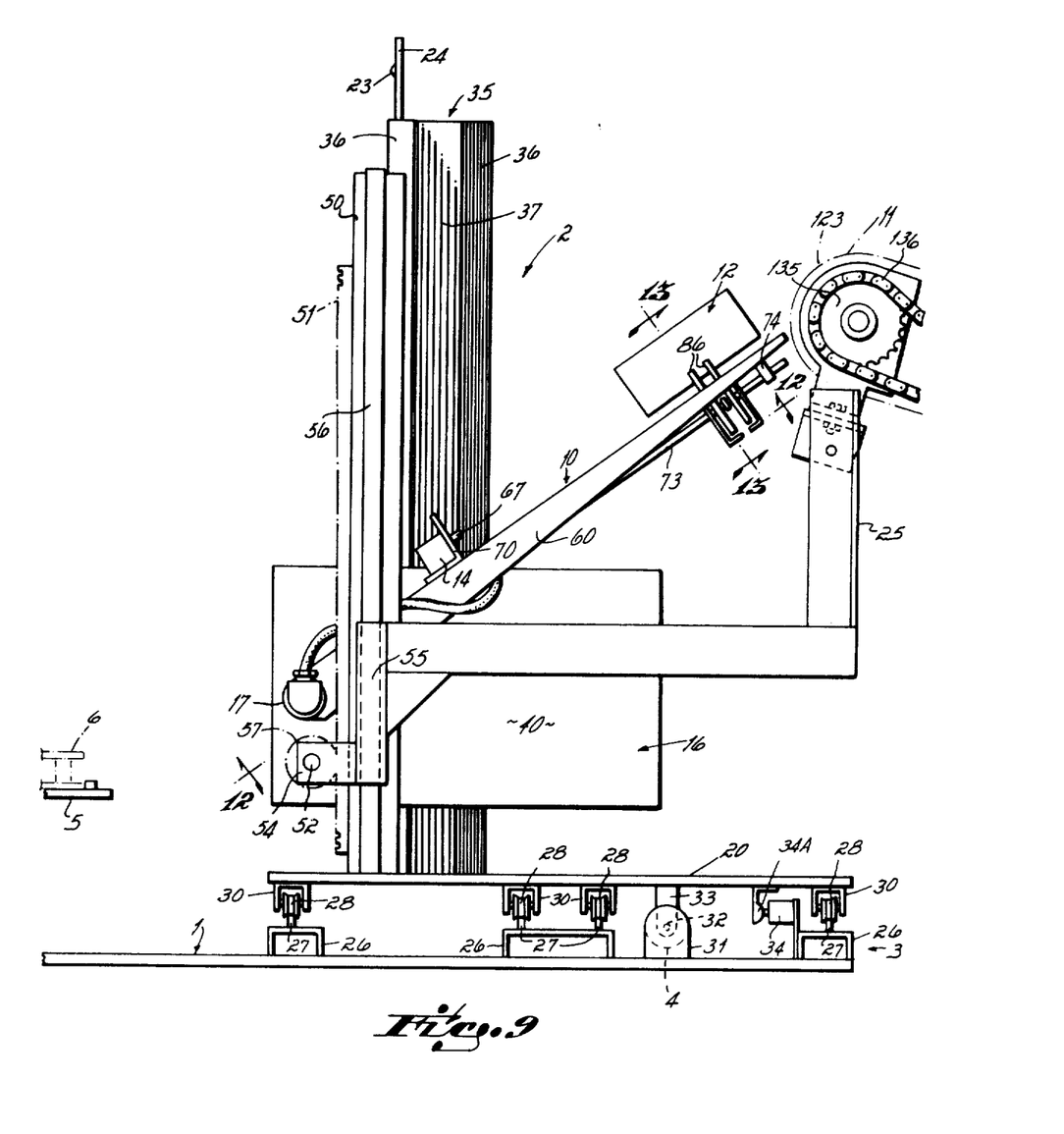
FIG. 9 is a side elevation, as projected along the line 9—9 of FIG. 8, further disclosing the components of the stacking machine.

The swinging arm 10, as pointed out earlier, is connected to carriage 16 by the tubular rock shaft 17, (FIGS. 8 and 9). Rock shaft 17 is journalled between the spaced side plates 40—40 of carriage 16 and its free end projects in cantilever fashion as at 48. The lower edge of swinging arm 10 is attached to the cantilever portion 48 by welding or the like.

In order to absorb stresses and to stabilize the carriage 16 and the cantilever portion 48 of the rock shaft 17 and swinging transfer arm 10, the lift platform 20 further includes a pair of vertical standards 50—50, each including an outwardly facing rack 51 (FIG. 8). A cross shaft 52 has one end journalled as at 53 in carriage 16 and its opposite end journalled in a guide block 54. Guide block 54 includes a sleeve 55 guided by vertical motion relative to a standard 56 (FIG. 9). The cross shaft 52 includes at opposite end portions, respective pinions 57—57 keyed to the shaft 52 and meshing with the racks 51—51. Cross shaft 52 thus rotates in an idling condition in response to vertical carriage motion.

Since the opposite ends of stabilizing cross shaft 52 are journalled and its pinions 57—57 mesh with the racks 51—51, the cross shaft is held to a horizontal plane as it moves with respect to the racks 51 in unison with vertical motion of carriage 16. The outer end of cantilever portion 48 of rock shaft 17 derives support from cross shaft 52 by a bearing block 58, the free end of rock shaft 52 being stabilized by guide block 54 in which it is journalled. Accordingly, angular forces imposed upon carriage 16 and cantilever portion 48 of rock shaft 17 are equalized by operation of the racks 51 and pinions 57, while the bearing block 58 supports the outer end of cantilever portion 48 for correspondingly horizontal motion, thereby carrying the weight load of the swinging bag flipper arm 10.

BAG TRANSFER ARM

As noted earlier, the swinging bag transfer arm or flipper 10 has one end attached by welding to the cantilever portion 48 of rock shaft 17. For stiffening purposes, the swinging transfer arm includes marginal ribs 60—60 along opposite side edge portions, the lower ends of the ribs interfitting the rock shaft 17 (cantilever portion 48) and being welded thereto (FIG. 9).

Rotary motion, which is imparted to the rock shaft 17, thus swings arm 10 through an arc generated about the axis of rock shaft 17 from the receiving position adjacent the discharge end of conveyor 11 (FIG. 10) for delivery to the pallet 6 (FIG. 11), as indicated by the arrow.

Swinging motion is imparted to rock shaft 17 and arm 10 by power cylinder 15 (FIG. 10) which is energized by fluid pressure. Cylinder 15 is secured to one of the side plates 40 of lift carriage 16 and includes a piston (not shown) driving a piston rod 61 including a rack 62. Rack 62 meshes with a pinion 63 attached to the outer end portion of rock shaft 17 for swinging the arm 10 in forward and reverse directions, as noted. For this purpose, the hydraulic circuit includes conduits connected to opposite ends of cylinder 15 and the electrical circuit actuates a reversing valve for supplying hydraulic pressure to the opposite ends of the cylinder 15.

In order to hold the rack 62 in mesh with the pinion 63, there is provided a hold-down idler roller 64 journalled as at 65 above the rack in the side plate 40 of lift carriage 16. The stroke of the piston of cylinder 15 and its rack 62 is regulated to provide the angle of swinging motion from the bag receiving position to the bag deposit position (FIG. 11), as indicated earlier by the arrow.

It will be understood at this point, that the carriage 16, arm 10 and conveyor 11 comprise a self-contained unit, such that the arc of swing of the arm remains constant relative to the carriage but changes relative to the pallet 6 in order to build up the stack 9. During the stacking operation, the carriage 16 and arm 10 maintain a constant level with respect to the delivery end of conveyor 11 since the conveyor is joined to the carriage by the frame 25 which provides the universal swivel connection between the carriage and conveyor.

During the stacking operation, as noted earlier, the levelling switch 22 moves upwardly with the carriage in order to stop the carriage and arm at successive levels corresponding to the thickness of the bags 8 being stacked upon the pallet. For this purpose, levelling switch 22 includes an arm 66, having a roller 23A (FIG. 10) which is actuated by the trip abutment cams 23 mounted upon the standard 24 (FIGS. 8 and 10). The spacing of the cam abutments corresponds to the thickness of one layer of bags.

After the successive layers of bags have been stacked to the predetermined limit, the carriage and arm will have been elevated to a position in which roller 23A is actuated by the uppermost trip abutment 23, thus completing one stacking cycle. At this point, the control circuit causes the lift assembly, comprising a carriage 16 and its swinging arm 10, to descend back to the starting position as shown in FIG. 10. The control system which regulates this operation is described later.

BAG GRIPPING MECHANISM

The bag gripping jaws, previously indicated at 12—12, are mounted upon the swinging end portion of the bag transfer arm 10 in the bag receiving position (FIGS. 8, 10 and 11). In this position, the jaws are spread apart to receive the bag as it issues from the discharge end of conveyor 11. As the bag is delivered to the arm from the conveyor it passes between the gripping jaws 12, the bag being delivered in a lengthwise position relative to the arm from conveyor 11. The bag thus slides between the open jaws 12 until its lower edge engages the plunger 67 of switch 14, with the lower or leading edge of the bag arrested by the stop bracket 70 carried by arm 10.

Switch 14 is interconnected in the electrical control circuit to energize the power cylinder 13 (!FIG. 12), causing the cylinder to force the jaws to the bag gripping position. After the bag 8 is gripped between the jaws 12, the control circuit energizes the power cylinder 15 (FIG. 10), causing transfer arm 10 to swing from its receiving position to the bag deposit position shown in FIG. 11. The action of the gripping jaws 12 in receiving and gripping the bag is as indicated in broken lines in FIG. 13.

Described in detail (FIGS. 12 and 13) actuating cylinder 13, which operates the jaws 12, includes a piston (not shown) having a piston rod 71. The piston rod is adjustably connected as at 72 to a connecting rod 73 (FIG. 12), with the forward end of the connecting rod passing slidably through a slide block 74 attached to the swinging portion of arm 10. An equalizing lever 75 has its central portion pivotally connected as at 76 to the connecting rod 73. The outer ends of equalizing lever 75 are pivoted as at 77—77 to a pair of links 78—78.

To impart clamping pressure to jaws 12, the opposite ends of links 78 are connected by pivot pins 80 to respective bell crank levers 81—81. Each bell crank lever is connected by pivots 82 to a cross bar 83 attached to the lower side of bag transfer arm 10 (FIGS. 12 and 13). The piston of cylinder 13, connecting rod 73 and associated linkage is shown in FIG. 12 with the gripping jaws 12 in the open or in bag receiving position.

The connecting rod 73 and the associated linkage operates the jaws 12 in toggle fashion as the connecting rod 73 is extended to close the jaws. For this purpose, each bell crank lever 81 includes a jaw-actuating link 84 pivotally connected as at 85 to the swinging end portion of the bell crank 81. The opposite end of each jaw-actuating link 84 is connected by pivot pin 79 (FIG. 13) to respective pairs of spaced jaw mounting levers 86. The jaw mounting levers are pivoted as at 87 between spaced pairs of lugs 88 (FIGS. 12 and 13) secured to arm 10 so that the swinging motion of the jaw mounting levers 86, through operation of connecting rod 73, swings the jaws in unison from the open position to the closed bag gripping position indicated in FIG. 13. The levers 86 pass upwardly through openings 89 of plate 10 for clearance.

As best shown in FIGS. 12 and 13, the respective bag gripping jaws 12 are in the form of elongated plates which are arcuate in cross-section, having their lower ends secured as by welding to the swinging end portion of the jaw mounting levers 86. The length of the jaws is sufficient to provide a firm grasp upon the upper portion of the bag 8 (FIG. 13) while the lower end of the bag rests upon bracket 70 and trips the plunger 67 of control switch 14 as noted earlier (FIG. 11). The piston of cylinder 13, piston rod 71 and connecting rod 73 are shown in the retracted position in FIG. 12 with the jaws 12 shown in the fully open or bag receiving position shown at A in FIG. 13.

The jaws assume the A position when the transfer arm 10 is in the receiving position shown in FIGS. 8 - 11. Thus the bag issues from the discharge end of conveyor 11 and slides between the open jaws in the A position until the lower or leading end of the bag 8 trips the plunger 67 of the switch 14, as indicated. At this point, fluid pressure is admitted to the rearward end of cylinder 13 (FIG. 12) which is attached as at 90—90 to the bracket 70 of the transfer arm, thus forcing the piston and connecting rod 73 in the direction indicated by the arrow in FIG. 12.

Fluid pressure is supplied to the rearward end of cylinder 13 and is exhausted from its forward end through conduits by operation of a reversing valve actuated by the electrical control system. As the connecting rod 73 shifts forwardly, the toggle linkage between the connecting rod and jaws cause the jaws to shift toward one another from the position A to the position B so as to firmly grasp the upper portion of the bag from opposite sides.

After the bag is thus grasped by the jaws 12, the control system actuates cylinder 15 (FIG. 10) so as to rotate rock shaft 17 in a direction to swing arm 10 from the receiving position of FIG. 10 to the bag depositing position shown in FIG. 11. As the bag is deposited upon the pallet 6, or upon the bags previously deposited layer, the lower or free edge of the bag first is brought into contact with the supporting surface. Thereafter, by operation of the control circuit, the jaw-actuating cylinder 13 is actuated to again retract connecting rod 73 so as to open the jaws 12 from position B to position A, thus allowing the forward end portion of the bag to drop upon its supporting surface. Thereafter, the transfer arm 10 swings back to its receiving position. At this time, the turntable 5 may be indexed through an angle of 90° to a position to receive another bag, or in other instances, the turntable may remain stationary while the lift assembly 2 is shifted laterally to a second position for the next cycle. The exact sequence of motions is determined by the desired pattern of bags to be stacked in layers. The machine can be programmed to carry out the necessary sequence for a given installation, as explained later.

TURNTABLE

As noted earlier, the turntable 5 is mounted upon the base 1 in common with the lift mechanism 2 to complete the organization of the components. The turntable 5 supports the pallet 6 and rotates stepwise through angles of 90° each in time with the reciprocating movements of the lift assembly to distribute the bags 9 in layers which are interlocked within the stack. The layers of bags are tied together in a manner similar to that in which a brick wall is laid up with the joints and courses staggered so that there is a solid mass above each joint or spacing between the bags of the next layer. As noted, this is brought about by the reciprocating movements of the lift assembly 2 upon its tracks 3, in time with the 90° stepwise rotation indexing movements of the turntable until a 360° turn is completed. At this time the next layer is deposited on the pallet 6.

Described in detail, (FIGS. 14 and 15) the turntable comprises a circular plate 91 having a circular tracking ring 92 secured by the brackets 93 to its under surface. The tracking ring 92 is supported for rotary motion upon a series of flanged rollers 94 journalled as at 95 in U-shaped brackets 96. The brackets are supported at the required elevation by spacer blocks 97 resting upon the base 1 and reinforced by ribs 98. In the present disclosure, the tracking ring 92 is carried by a set of 5 flanged rollers 94 spaced equidistant apart from one another.

The tracking ring 92 is provided with a set of four locking detents 100 spaced apart at 90° for holding the tracking ring and turntable 91 at its indexed positions. The locking action is carried out by a solenoid 101 having its armature 102 connected to a bell crank lever 103 pivotally connected as at 104 to a cross piece 105 extending across the base plate 1. The solenoid 101 is also connected to cross piece 105 by a bracket 106. The vertical limb 107 of the bell crank engages the periphery of tracking ring 92 and thus acts as a stop to engage the locking detents 100 as the table and tracking ring 92 are indexed in the direction indicated by the arrow.

At the start of the indexing movement, the solenoid 101 is energized by the electrical control circuit to retract its armature. This swings the bell crank lever in the direction indicated by the arrow (FIG. 14) so as to disengage arm 107 from the detent 100. This permits the turntable and tracking ring again to be indexed through its angle of 90°.

Motive power is imparted to the turntable by operation of the rotary power unit, previously indicated, which is of a commercially available type including a rotor or vane (not shown) which reciprocates through an angle more than 90° and less than 360°. Generally speaking, the rotary power unit is hydraulically operated, including an external housing, as indicated at 7, which is attached to the base plate 1. The power unit 7 operates a pawl and ratchet mechanism indicated at 108 so that to impart the indexing motion to the turntable, the indexing mechanism being arranged to shift the turntable through an angle of 90° upon each indexing cycle. The indexing motor 7 is hydraulically operated and is capable of indexing the table through its stepwise advancement by operation of the electrical control system.

An oscillating shaft 110 projects upwardly through the power unit housing 7 and a ratchet lever 111 includes a hub 112 secured to shaft 110. The ratchet lever in the form of a bell crank having a spring-loaded limb 113, the outer end of which is anchored to a tension spring 114 secured to cross pieces 105. The outer end of companion arm 115 includes a pawl 116 pivoted as at 117 to the end of arm 115 and biased toward a ratchet ring 118 attached to the lower surface of the turntable plate 91, concentric with its axis of rotation. The ratchet ring 118 is attached to the lower surface of the turntable plate 91, concentric with its axis of rotation. The ratchet ring 118 includes notches or interdental spaces 120 located at angles of 90° about the ratchet ring and engaged by pawl 116. The pawl is biased by a tension spring 121 so that its outer or swinging end is held in engagement with the periphery of the ring 118.

Figure 15:
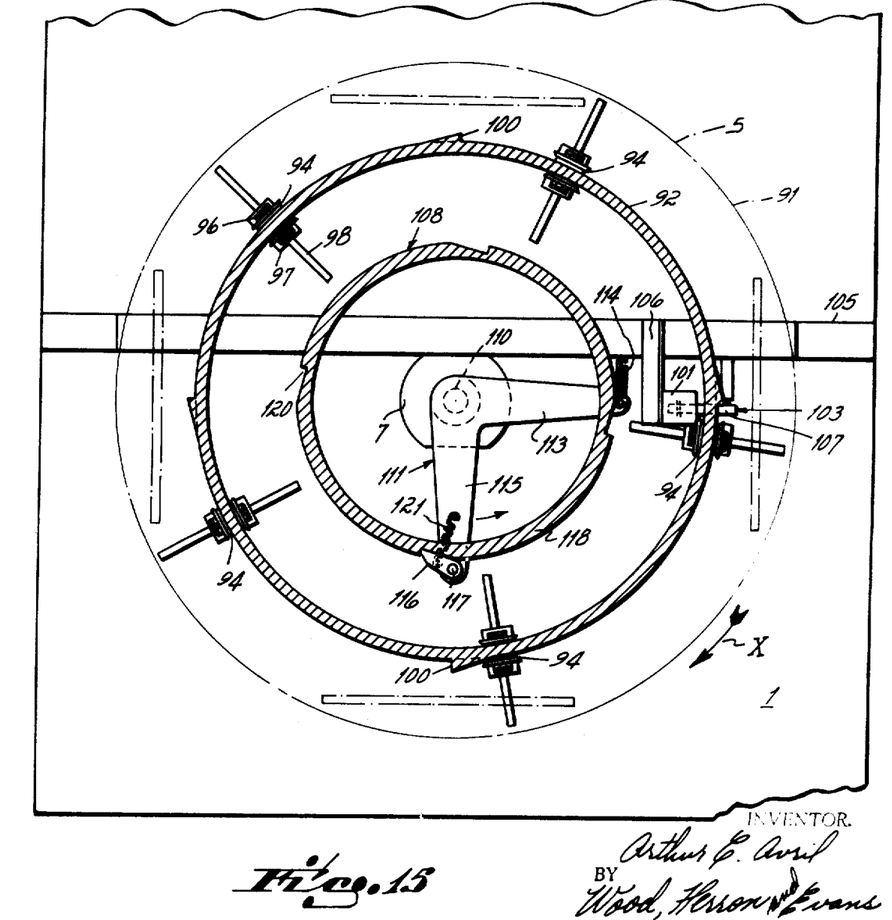
FIG. 15 is a top plan view, taken along the line 15—15 of FIG. 14, with the turntable removed to illustrate the mechanism which indexes and locks the turntable during its indexing motions.

Preferably, during an indexing cycle, the control circuit first energizes solenoid 101 so as to retract vertical arm 107 of bell crank lever 103 from its locking detent 100. The control circuit thereafter supplies hydraulic fluid to indexing motor 7 in a direction to swing the ratchet lever 111 and pawl about the periphery of ratchet ring 118 in a retracting direction, opposite to the direction indicated by the arrow X (FIG. 15). The swinging motion of pawl 116 is sufficient to retract at a distance greater than 90° so as to provide clearance for engagement with the next notch 120. The motor is then energized in the reverse direction to swing the bell crank lever and pawl 116 in the indexing direction, as indicated by the arrow X. After the rotary indexing motion has been started, the solenoid 101 is energized permitting its locking limb 107 to rest against the periphery of the tracking ring 92 so that the next locking detent 100 will be engaged at the completion of the indexing motion. The indexing motor 7 includes a positive stop (not shown) which locks the ratchet lever 111 at its final limit (FIG. 15). The turntable 5 is thus locked against rotation in the indexing direction by locking arm 107 and in the reverse direction by the engagement of pawl 116 with its notch 120. The turntable 6 thus remains fixed in stationary position until the control system is energized for the next indexing cycle.

BAG STITCHER CONVEYOR

The filled bags 8 are transported to the stacking machine by the bag conveyor 11, which extends at an inclined angle upwardly, with its lower end mounted upon rollers 122 and its upper end supported by the lift carriage 16 (FIG. 10) as previously described. As noted, the lift carriage 16 carries the bag transfer arm 10 which is elevated to correspond with the level of the stack as it is built up upon pallet 6. Thus, the arm 10 (FIG. 10), with its bag gripping jaws 12, remains at a constant level relative to the bag conveyor 11 through frame 25 (FIG. 10) which connects the conveyor to carriage 16 so as to support the delivery end 123 of conveyor 11 at a corresponding level.

The empty bags 8 are filled while resting upon a stitcher conveyor 124 (FIG. 16) extending horizontally from the discharge spout 125 of a blending apparatus similar to that shown in U. S. Avril Pat. No. 3,097,461, to which attention is invited. As disclosed in the patent, the filling operation is controlled by an operator in response to an apparatus which provides a signal when the dry mixture is ready to be bagged. Upon perceiving the signal, the operator manipulates an electrical switch which causes the blender 126 to discharge the dry materials in thoroughly intermixed condition into the bag 8 which is disposed with its open end below the discharge chute. The dry mixture, whether concrete, cement, motar mix, or any other product is discharged into the bag in warm blended condition immediately after having been dehydrated.

After the bag has been filled, it is transferred by the bag stitcher conveyor 124 to a stitching machine, indicated diagrammatically at 127. The stitching machine, as disclosed in the U. S. Avril Pat. No. 3,097,461, closes the open end of the bag then applies a tape across the open top, after which the tape is stitched to the bag by operation of the stitching machine 127. This completes the closure and sealing of the filled bag.

Figure 16:
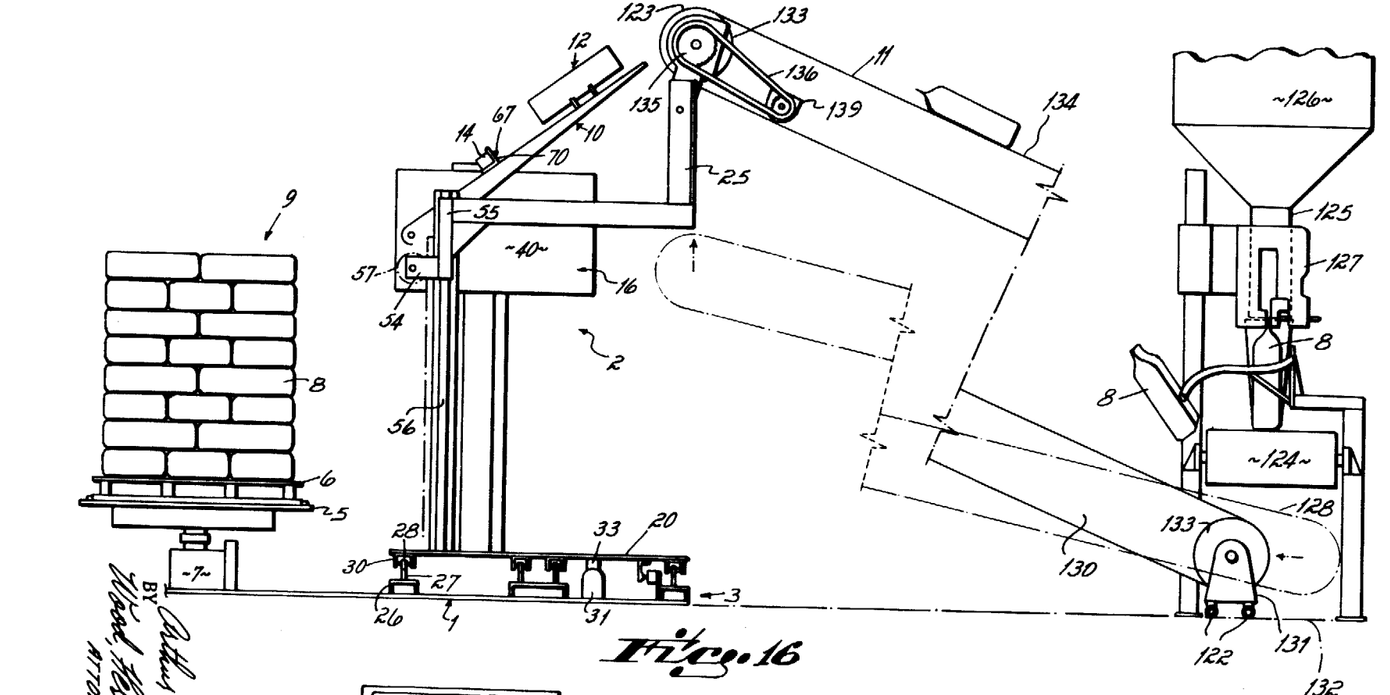
FIG. 16 illustrates diagrammatically a bagging and stitching mechanism which discharges filled bags to the bag conveyor of the stacking machine. In this view the carriage of the machine is shown at its upper limit of travel, with a completed stack deposited upon the pallet which rests upon the turntable.

After the stitching operation, the bag continues its advancement toward the end portion of conveyor 124, at which point it is transferred to the lower or receiving end 128 of conveyor 11 (FIG. 16). As noted earlier, the lower or receiving end is carried upon rollers 122 adjacent the conveyor 124, while the upper or discharge end is connected to carriage 16, as at 25, for vertical movement with the carriage and relative angular swivelling to compensate for lateral carriage motion. By operation of the stitcher conveyor 124 and bag conveyor 11 (illustrated diagrammatically) the loaded and stitched bags are transported at random from the floor level and deposited upon the arm 10 between the bag gripping jaws 12, which are open at this stage of the cycle. As noted, this operating cycle is initiated at random, when the bag 8 drops upon arm 10 between jaws 12 to trip bag-actuated switch 14.

In the present example, the bag conveyor 11 is conventional in design, comprising a longitudinal frame 130 (FIG. 16) suitably braced by cross-pieces (not shown) the lower end of the frame journalling the rollers 122 in brackets 131 swivelled to the longitudinal framing members 130 at the lower or receiving end 128 of the conveyor. The rollers 122 preferably ride upon tracks 132 mounted on the floor adjacent the conveyor 124.

The bag conveyor 11 includes belt tensioning rolls 133 at its receiving and discharge ends carrying a conveyor belt 134 having a surface suitable to support the loaded bags.

The upper drive roll 133 of conveyor 11 includes a sprocket 135 (FIG. 16) secured to the shaft of the roller, the sprocket being driven by a chain 136. A motor 139 has a sprocket in driving connection with a sprocket chain 136 in the usual way for driving the bag conveyor in the direction indicated. The conveyor motor, which drives belt 134, is energized independently of the bag stacking machine and advances the belt at a constant speed.

The bag stitching conveyor 124 is also driven independently and, as noted, advances the bags through the stitching machine 127 after they are filled. The filled bags 8 are thus delivered in random fashion to the bag conveyor 11 and transported along the upwardly inclined conveyor belt to the open gripping jaws 12 and transfer arm 10. As noted, each individual bag is delivered at the discharge end 123 of the conveyor and slides downwardly upon the surface of arm 10 with its leading edge arrested by the angle bracket 70 and thus trips the plunger 67 of switch 14. This initiates the operating cycle, causing the arm 10 to transfer the bag to the pallet 6 and also causing the several components of the machine to operate sequentially as the several limit switches are tripped.

OPERATION

As noted, the operating cycles of the bag stacking machine are carried out at random in response to the conveyance of the stitched, loaded bags 8 from stitcher conveyor to bag conveyor 11 to the discharge end 123 for delivery to the flipper or transfer arm 10. Each operating cycle is initiated when the bag slides downwardly along the surface of inclined arm 10 to be arrested by the angle bracket 70, thus tripping the plunger 67 of switch 14. The position of bag 8 at this point is indicated in broken lines in FIG. 11.

Upon being tripped, switch 14 signals the electrical control circuit to actuate a hydraulic valve controlling the operation of cylinder 13 (FIGS. 12 and 13). Hydraulic fluid is then admitted by way of pressure conduit indicated diagrammatically at 140, and exhausted by way of conduit 141, causing forward motion of connecting rod 73 as indicated by the arrow. This action closes the bag gripping jaws 12, with the upper portion of the bag resting upon the surface of arm 10.

After switch 14 has been closed (with bag 8 grasped between jaws 12) an electrical impulse is transmitted to the control circuit, admitting hydraulic pressure to the rearward end of cylinder 15 by way of pressure conduit, as shown diagrammatically at 142 and exhausting by way of conduit 143 (FIG. 10). In response, rack 62 (FIG. 10) moves forwardly so as to rotate the pinion 63, in the direction indicated by the arrow (FIG. 10).

Energization of power cylinder 15 (rack 62 — FIG. 10) rotates rock shaft 17 in a direction to swing arm 10 through its arc to a stationary position slightly above pallet 6, as indicated in FIG. 11.

The action of depositing the bag 8 upon the pallet 6 approximates the method of stacking the bags by hand. In other words, at the limit of swinging flipper arm motion, the leading end of the bag drops down upon the pallet, as indicated by the broken lines (FIG. 11); at this point, the gripping jaws 12 release the forward portion of the bag. Thus, the bag is brought approximately to the receiving surface (pallet 6 or surface of previously deposited layer of bags) then is allowed to drop by gravity to its final position.

As the leading end of the bag drops by gravity to its supporting surface (FIG. 11), the end of the bag slides from stop bracket 70 so as to disengage plunger 67 of switch 14.

When plunger 67 of switch 14 snaps back to its normal position, a signal is transmitted to the control circuit to open the bag gripping jaws 12. Upon receiving the signal, hydraulic fluid pressure is transmitted by way of conduit 141 and exhausted by way of conduit 140 so as to retract connecting rod 73, to the position shown in FIG. 12, thereby opening jaws 12. This allows the leading or forward portion of the bag to drop by gravity upon the pallet surface or upon the previously stacked layer of bags.

A circuit is now established to apply pressure by way of conduit 143 (FIG. 10), exhausting by way of conduit 142 so as to retract rack 62 and swing the flipper arm 10 back to the bag receiving position adjacent conveyor 11, with the gripping jaws remaining in the open position ready to receive the next bag discharged by the conveyor (FIG. 10).

A typical stacking operation, as programmed by switches 34 and switch actuating cam 34A is described below.

As noted, the lift assembly 2 (carriage 16 and arm 10) is tracked for lateral movement upon the rails 27 (FIG. 8), the horizontal movements of lift platform 20 being carried out by cylinder 4 under the control of limit switches 34 and its switch actuating cam or button 34A. The button is located lengthwise relative to the tracks 27 in a position to determine or program the lateral motions of platform 20 and lift assembly 2 (carriage 16 and arm 10) by tripping the switches 34. Thus, the right hand position of the lift assembly 2 and arm 10, shown in FIG. 2, may represent a starting position for depositing the first bag A, after which the turntable 5 is indexed for deposit of bag B (FIG. 3). At this point, the control system activates cylinder 4 (FIGS. 8 and 9) to shift the platform 20 and lift assembly 2 (arm 10) toward the left until the intermediate lateral control switch 34 is tripped by the related abutment or cam 34A. The lift assembly is thus positioned to deposit bag C (FIG. 4) alongside bag B.

Figure 5:
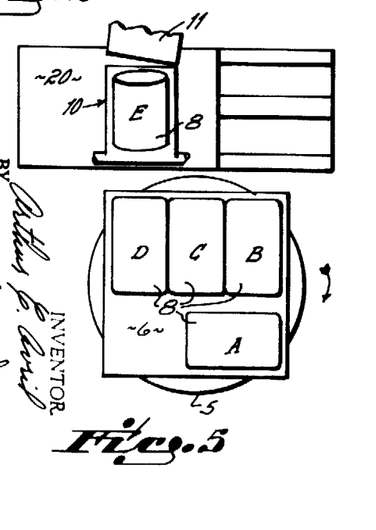

After bag C has been deposited (FIG. 4), the lift assembly 2, including platform 20, is again shifted toward the left relative to the turntable 5 for depositing bag D alongside bag C (FIG. 5). During this operation, the turntable 5 and pallet 6 resting upon it, remain stationary.

The machine may be programmed to stack the bags in any desired pattern by proper location of tripping cam or button 34A, with corresponding changes in the control circuit, if necessary.

Figure 6:
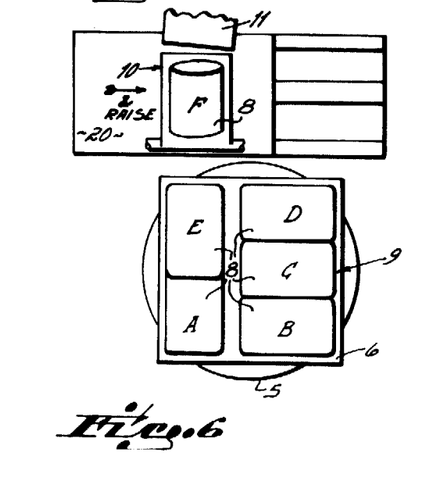

Assuming that the row of bags B, C and D have been deposited (FIG. 5), the circuit is signalled to index the turntable 5 and pallet 6 through an angle of 90° so as to position the pallet to receive the next bag E (FIG. 6). In order to index the pallet, solenoid 101 is energized to withdraw locking arm 107 (FIG. 14) from the locking detent 100. Thereafter, the rotary indexing motor 7, through operation of the control circuit and hydraulic system, is energized to cause the ratchet lever to impart the indexing motion by engagement of pawl 116 with the next indexing notch 120, while the solenoid 101 remains energized.

After the indexing motion is completed, solenoid 101 is deenergized so as to cause locking arm 107 to engage the next locking detent 100, thereby holding the turntable 5 and pallet 6 in indexed position, ready to receive the next bag E (FIG. 6) in overlapping relationship, as shown. The turntable and pallet are shown (FIG. 6) with bag E deposited after the indexing motion, and with the transfer arm 10 ready to deposit bag F.

Figure 7:
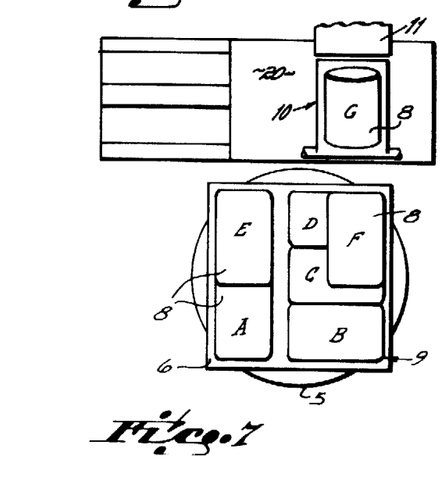

At this point, the electrical circuit will have been signalled to transmit fluid pressure to cylinder 4 by way of conduit 144, exhausting the opposite end of cylinder 4 by way of conduit 145. This shifts the lift assembly 2, including flipper arm 10, toward the right, as indicated in FIGS. 6 and 7, thus completing the bag transfer operation for the first layer, with flipper arm 10 swung back to the receiving position shown in FIG. 10. The components remain at rest until the next bag 8 is transported to the inclined arm 10 (delivery end 123 of conveyor 11).

The placement of the first layer of bags in building up the stack is now completed. At this point, the circuit, by operation of levelling switch 22 (FIG. 10), conditions the hydraulic circuit to raise the lift assembly 2 (including carriage 16, and transfer arm 10) to the next level corresponding to the second layer of bags (lift cylinder 18).

Figure 2:
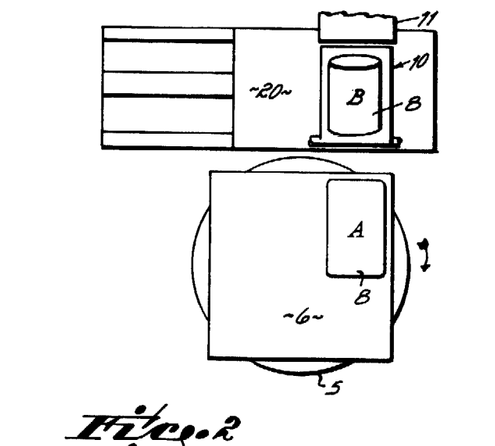
FIGS. 2 – 7 are diagrammatic top plan views generally similar to FIG. 1, showing the lateral movements of the carriage and flipper arm, combined with the rotary indexing movements of the turntable as the first layer of bags to form the stack is deposited upon the turntable.
Figure 3:
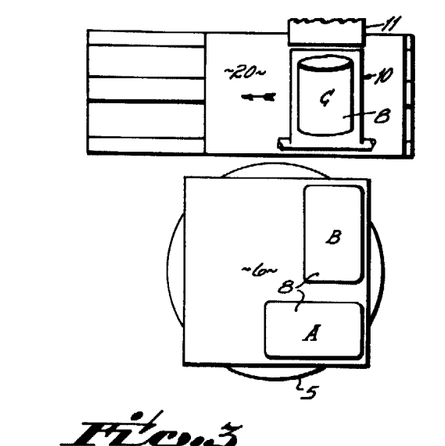
Figure 4:
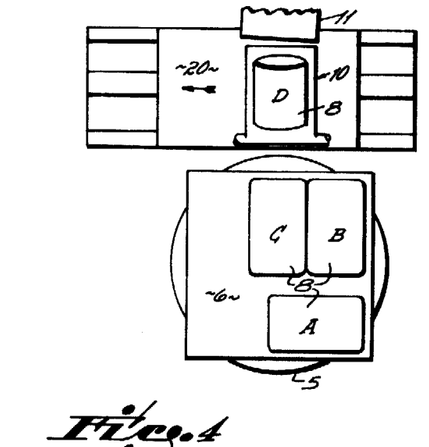

When the next bag F is delivered to transfer arm 10, platform 20, carriage 16, and lift assembly 2, as a unit, will have been shifted toward the right, as indicated (FIGS. 6 and 7) back to its starting position corresponding to FIG. 2. Bag F is now deposited crosswise upon bags C and D (FIG. 7) so as to provide the staggered relationship which interlocks the stack 9 to prevent it from shifting during transport. After bag F is deposited, the cycle is repeated (with carriage 16 and flipper arm 10 elevated) to place the next layer of bags in interlocking relationship upon the lower layer.

The operation now continues with alternate lateral shifting of carriage 16, swinging of flipper arm 10 and indexing motions of turntable 5 until the second row of bags is laid. Thereafter the lift assembly is again shifted upwardly (levelling switch 22, trip cams 23 and cylinder 18) so as to repeat the cycle.

The standard 24 is provided, in the present instance, with a set of eight trip cams (cams 23). Each trip cam 23 represents one layer of bags so that the stack is completed upon the placement of the eighth layer in the manner described. At this point, the operator stops feeding bags to conveyor 11 so that the circuit is deactivated, causing carriage 16 and arm 10 to remain at rest. A fork lift truck or other transporting means now lifts the loaded pallet 6 from the turntable for transport of the stack 9 and a fresh pallet 6 is placed in position for deposit of a new stack.

A finished stack 9, with the bags 8 laid up in overlapping layers and interlocked is shown diagrammatically in FIG. 16, ready for transport. After the pallet and stack have been removed from the turntable, and with a fresh pallet in place, the operator reactivates the circuit causing the carriage 16 and flipper arm 10 to descent to the starting level (FIG. 11) for deposit of the next stack in the manner described.

Figure 17:
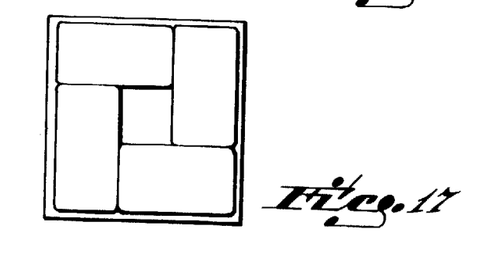
FIG. 17 is a diagrammatic top plan view, generally similar to FIGS. 2 – 7, but showing a somewhat modified stack in which the machine is programmed to deposit the bags in an interlocking pinwheel pattern.

Stack patterns other than that disclosed in FIGS. 2 – 7 are readily produced by appropriate changes in the control circuit and switches to carry out a given program. For example, a stack formation generally of pinwheel design may be desired in a given plant. In this case, the circuit would be programmed to index turntable 5 and pallet 6 through 360° in steps of 90° each, while lift assembly 2 and carriage 16 remain stationary during deposit of each layer. The first layer so deposited, is indicated diagrammatically in FIG. 17.

After deposit of the first layer, carriage 16 is shifted laterally and also upwardly a distance equal to the next layer of bags. The lateral shifting relocates flipper arm 10 so that the next layer will be staggered relative to the lower. This sequence is repeated after placement of each layer, until a stack having the desired number of layers in interlocked relationship will have been built up.

Various other stack patterns may be produced by making appropriate changes in the control system.

Having described my invention I claim:

1. A stacking machine for depositing filled bags of granulated material and similar articles in stack formation, the components of the stacking machine comprising,
    a lift assembly movable laterally in a generally horizontal plane,
    a carriage mounted on the lift assembly and movable vertically relative to the lift assembly,
    a transfer arm having an end portion pivotally connected to the carriage for swinging motion about a horizontal axis from a loading position to a discharge position,
    bag gripping means mounted on an end portion of the transfer arm for alternately gripping and releasing a bag placed on the bag transfer means, said gripping means comprising jaws pivotally connected to the transfer arm, actuating linkage connected to the jaws for opening and closing the jaws relative to a bag, and operating means connected to the linkage for opening and closing the jaws, thereby to close the jaws and grip a bag resting upon the transfer arm between the jaws in the loading position of the arm and to open the jaws and release the bag when the transfer arm swings to the discharge position; and
    a turntable disposed adjacent the lift assembly and carriage means in a position to receive a bag gripped by the bag gripping means of the swinging arm,
    said stacking machine thereby being adapted to deposit said bags in a predetermined stack pattern upon the turntable by the coordinated movements of the said components of the machine and rotary indexing movements of the turntable through successive cycles of operation.

2. A lift assembly as set forth in claim 1 in which there is provided a stationary base resting upon a support surface, tracking means mounted upon said lift assembly and the base, the said lift assembly being shiftably carried by said tracking means to provide lateral movements of the lift assembly relative to the base, and relatively movable control means on the base and lift assembly to regulate the lateral movements of the lift assembly in said horizontal plane relative to the base.

3. A stacking machine as set forth in claim 1 including a power device for shifting the carriage and transfer arm vertically relative to the lift assembly, leveling control means, and vertically spaced actuating elements coacting with said leveling control means, said control means and actuating elements relatively mounted on the carriage and lift assembly and regulating operation of the power device for depositing layers of bags one upon another in said stack pattern upon the turntable.

4. A stacking machine as set forth in claim 1 including a device for shifting the carriage and transfer arm vertically relative to the lift assembly, a standard rising from the lift assembly, control means mounted on the carriage, and a series of vertically spaced actuating elements mounted upon said standard, said spaced actuating elements operating the control means and regulating the operation of said device which shifts the carriage and bag transfer means vertically for depositing layers of bags one upon another in said stack pattern upon the turntable.

5. A stacking machine as set forth in claim 1 including
    control means mounted upon the bag transfer arm in a position to be tripped by a bag resting upon the arm between the jaws, said control means energizing the operating means and causing the jaws to grip the bag when the bag is deposited upon the arm between the jaws.

6. A stacking machine as set forth in claim 1 including
    control means mounted upon the bag transfer arm in a position to be tripped by a bag resting upon the arm between the jaws, said control means energizing the operating means and causing the jaws to grip the bag when the bag is deposited upon the arm between the jaws when the transfer arm is in said loading position, and said control means energizing the operating means and causing the jaws to release the bag when the arm swings to said discharge position for deposit of the bag upon the turntable.

7. A stacking machine as set forth in claim 1 in which there is provided a base supporting the lift assembly for lateral movement, said base having means thereon supporting the turntable for rotary indexing movements relative to the base, and means imparting the rotary indexing movements to the turntable in time with the coordinated movements of the said components of the stacking machine.

8. A stacking machine as set forth in claim 1 in which there is provided a base supporting the lift assembly for lateral movement, said base having tracking means thereon supporting the turntable for rotary indexing movements relative to the base, means imparting the rotary indexing movements to the turntable, and means locking the turntable in said indexed positions, whereby indexing motion is imparted to the turntable in time with the coordinated movements of the components of the stacking machine.

9. A stacking machine as set forth in claim 1 in which there is provided a base supporting the lift assembly for lateral movement, said base having tracking means thereon adjacent the lift assembly supporting the turntable for rotary indexing movements relative to the base, a rotary power unit mounted on the base, an indexing arm mounted on the power unit and imparting said indexing movements to the turntable, and locking means for holding the turntable in said indexed positions, whereby indexing movements are imparted to the turntable in time with the coordinated movements of the components of the stacking machine.

10. A stacking machine for depositing filled bags of granulated material and similar articles in stack formation, the components of the stacking machine comprising:
   a lift assembly movable laterally in a generally horizontal plane;
   a carriage mounted on the lift assembly and movable vertically relative to the lift assembly;
   bag transfer means having an end portion pivotally connected to the carriage for swinging motion from a generally upright loading position to an inverted discharge position;
   bag gripping means mounted on an end portion of the bag transfer means for gripping a bag placed on the bag transfer means when said means is in the said generally upright loading position;
   a turntable disposed adjacent the lift assembly and carriage means in a position to receive a bag gripped by the bag gripping means of the bag transfer means; and
   an upwardly inclined bag conveyor with power means driving the conveyor, said conveyor having a lower bag receiving portion disposed adjacent the stacking machine, said bag conveyor having an upper bag discharge end connected to the carriage for vertical movement of the upper discharge end with the carriage and bag transfer means, said upper discharge end of the conveyor disposed above the bag transfer means for discharging a bag thereon when said bag transfer means is in said loading position,
   said stacking machine thereby being adapted to deposit said bags in a predetermined stack pattern upon the turntable by the coordinated movements of the said components of the machine and rotary indexing movements of the turntable through successive cycles of operation.

11. A stacking machine as set forth in claim 10 in which there is provided a stationary base resting upon a support surface, said base and said lift assembly having tracking means relatively mounted thereon providing lateral movement of the lift assembly upon the base, and means mounted relatively to said base and lift assembly for imparting lateral movements of the lift assembly upon the base.

12. A stacking machine as set forth in claim 10 in which the lift assembly includes guide means, the carriage being mounted for vertical motion relative to the guide means for raising and lowering the transfer arm which is pivotally connected to the carriage, stabilizing elements mounted on the lift assembly, stabilizing devices on the carriage connected to the stabilizing elements and coacting therewith for stabilizing the carriage relative to the guide means, and means for shifting the carriage and transfer arm vertically relative to the said guide means for depositing layers of bags one upon another in stack formation upon the turntable.

13. A stacking machine as set forth in claim 10 in which the lift assembly includes at least one guide column, the carriage being mounted for vertical motion relative to the guide column for raising and lowering the transfer arm which is pivotally connected to the carriage, the lift assembly having a pair of vertical racks, a cross shaft rotatably journalled in the carriage, and a pair of pinions secured to the cross shaft and meshing with said racks for stabilizing the carriage relative to the guide column, and means for shifting the carriage and transfer arm vertically relative to the said vertical guide members, for depositing layers of bags one upon another in said stack pattern upon the turntable.

14. A stacking machine as set forth in claim 10 in which said lower bag receiving portion tracks upon a generally horizontal surface adjacent the stacking machine for movement in a horizontal direction, and said upper bag discharge end being hingedly connected to the carriage.

15. A stacking machine as set forth in claim 10 in which said lower bag receiving portion tracks upon a generally horizontal surface adjacent the stacking machine for movement in a horizontal direction, and said upper discharge end being connected to the carriage by swivel means, whereby the upper portion of the conveyor moves vertically with the carriage and bag transfer means and moves laterally with the lift assembly.

16. A stacking machine for depositing bags of granulated material and similar articles in stack formation comprising:
   a lift assembly mounted for lateral movement in a horizontal path;
   lift power means imparting said lateral movement to the lift assembly;
   a carriage mounted on the lift assembly for movement vertically relative to the lift assembly;
   carriage power means imparting vertical movement to the carriage;
   a bag transfer arm having one end portion pivotally connected to the carriage for swinging motion from a rearwardly inclined loading to an inverted discharge position;
   arm power means imparting swinging motion to the bag transfer arm;
   a pair of normally open bag gripping jaws mounted on the swinging end portion of the bag transfer arm for gripping a bag deposited upon the bag transfer arm between the gripping jaws;
   jaw power means connected to the bag gripping jaws for opening and closing the jaws;
   stack receiving means disposed adjacent the lift assembly and carriage in a position to receive a bag gripped by the jaws of the bag transfer arm;
   and means for energizing, in a predetermined sequence, the lift power means, carriage power means, arm power means, and jaw power means, whereby the movements of said components are coordinated to deposit each bag upon the stack receiving means with the individual bags partially overlapped in stack formation.

17. A stacking machine as set forth in claim 16 in which there is provided an upwardly inclined bag conveyor, power means energizing said conveyor, said conveyor having a lower portion disposed upon a surface adjacent the stacking machine, said bag conveyor having an upper discharge end connected to the carriage for vertical movement of the discharge end with the carriage and bag transfer arm, said upper discharge end disposed above the bag transfer means for discharging a bag at random thereon when said bag transfer means is in said rearwardly inclined loading position, whereby the bag is deposited upon the transfer means between the normally open bag gripping jaws, and control means on the arm engageable by the bag for closing the bag gripping jaws, whereby the bag is gripped and said bag transfer arm is swung to the inverted discharge position for depositing the bag upon the said stack receiving means.

18. A stacking machine as set forth in claim 16 in which there is provided an upwardly inclined bag conveyor, power means energizing said conveyor, said conveyor having a lower portion disposed upon a surface adjacent the stacking machine, said bag conveyor having an upper discharge end connected to the carriage for vertical movement of the discharge end with the carriage and bag transfer arm, said upper discharge end disposed above the bag transfer means for discharging a bag at random thereon when said bag transfer means is in said rearwardly inclined loading position, whereby the bag is deposited upon the transfer means between the normally open bag gripping jaws, and control means on the arm engageable by said bag for closing the bag gripping jaws and for energizing the several power means in said predetermined sequence.

* * * * *